United States Patent
Khatri et al.

(10) Patent No.: US 10,095,540 B2
(45) Date of Patent: *Oct. 9, 2018

(54) VIRTUAL NETWORK PROVISIONING PRIOR TO VIRTUAL MACHINE MANAGER LAUNCH BY LOADING A PARTITIONED NETWORK DEVICE WITH ATTRIBUTE DATA

(71) Applicant: DELL PRODUCTS, LP, Round Rock, TX (US)

(72) Inventors: Mukund P. Khatri, Austin, TX (US); Sudhir V. Shetty, Cedar Park, TX (US)

(73) Assignee: Dell Products, LP, Round Rock, TX (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/282,250

(22) Filed: Sep. 30, 2016

(65) Prior Publication Data

US 2017/0017515 A1    Jan. 19, 2017

Related U.S. Application Data

(63) Continuation of application No. 13/853,661, filed on Mar. 29, 2013, now Pat. No. 9,465,637.

(51) Int. Cl.
*G06F 9/455* (2018.01)
*G06F 9/50* (2006.01)

(52) U.S. Cl.
CPC ........ *G06F 9/45558* (2013.01); *G06F 9/5077* (2013.01); *G06F 2009/4557* (2013.01); *G06F 2009/45595* (2013.01)

(58) Field of Classification Search
CPC combination set(s) only.
See application file for complete search history.

(56) References Cited

U.S. PATENT DOCUMENTS

| | | | |
|---|---|---|---|
| 7,002,265 B2 | 2/2006 | Potega | |
| 7,475,262 B2 | 1/2009 | Banginwar et al. | |
| 7,871,278 B1 | 1/2011 | Herring et al. | |
| 7,925,756 B1 | 4/2011 | Riddle | |
| 9,032,198 B1 | 5/2015 | Marr et al. | |
| 2002/0022996 A1 | 2/2002 | Horgan | |
| 2004/0024955 A1 | 2/2004 | Patel | |
| 2006/0184936 A1 | 8/2006 | Abels et al. | |
| 2006/0259621 A1 | 11/2006 | Ranganathan et al. | |
| 2007/0008778 A1 | 1/2007 | Pirzada et al. | |
| 2007/0113222 A1 | 5/2007 | Dignum et al. | |
| 2009/0019022 A1 | 1/2009 | Schallert et al. | |
| 2010/0165877 A1 | 7/2010 | Shukla et al. | |
| 2010/0290473 A1 | 11/2010 | Enduri et al. | |
| 2011/0022694 A1 | 1/2011 | Dalai et al. | |
| 2011/0072293 A1 | 3/2011 | Enduri et al. | |
| 2012/0278802 A1 | 11/2012 | Nilakantan et al. | |

*Primary Examiner* — Benjamin C Wu
*Assistant Examiner* — Michael W Ayers
(74) *Attorney, Agent, or Firm* — Larson Newman, LLP

(57) ABSTRACT

A method includes receiving a deployment template at a host system, partitioning a networking device of the host system with a virtual network partition based upon the deployment template, receiving attribute data that includes a first attribute associated with the first virtual network partition, loading the networking device with the attribute data, launching a virtual machine manager on the host system, reading the attribute from the networking device, and assigning a virtual network interface of a virtual switch associated with the virtual machine manager to the virtual network partition in response to reading the attribute.

17 Claims, 6 Drawing Sheets

VIRTUAL NETWORK PROVISIONING PRIOR TO VIRTUAL MACHINE MANAGER LAUNCH BY LOADING A PARTITIONED NETWORK DEVICE WITH ATTRIBUTE DATA

CROSS-REFERENCE TO RELATED APPLICATION

This application is a continuation of U.S. patent application Ser. No. 13/853,661, entitled "Virtual Network Provisioning Prior to Virtual Machine Manager Launch by Loading a Partitioned Network Device with Attribute Data," filed on Mar. 29, 2013, the disclosure of which is hereby expressly incorporated by reference in its entirety.

FIELD OF THE DISCLOSURE

This disclosure relates generally information handling systems, and more particularly relates to automating virtual network provisioning.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
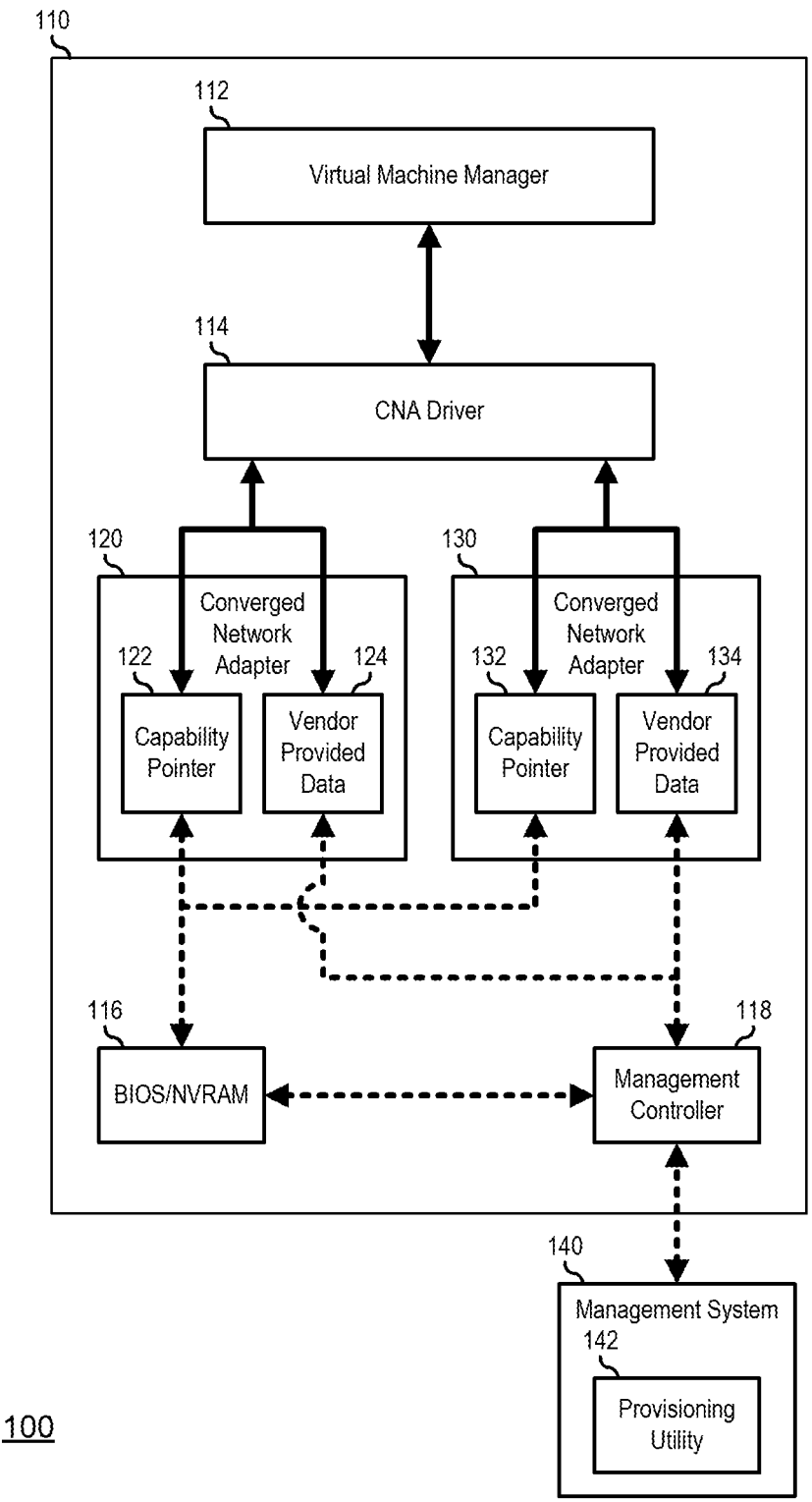
FIG. 1 is a block diagram illustrating a virtualized system according to an embodiment of the present disclosure.

FIG. 1 illustrates a virtualization system 100. For purpose of this disclosure virtualization system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Virtualization system 100 includes a host system 110 coupled to a management system 140. Information handling system 110 includes a virtual machine manager (VMM) 112, a converged network adapter (CNA) driver 114, a basic input/output system (BIOS) 116 including a non-volatile memory storage device (NVRAM), a management controller 118, and CNAs 120 and 130. VMM 112 provides a virtual operating platform and manages the execution of one or more virtual machine operating environments on host system 110. CNA driver 114 operates to control CNAs 120 and 130, and to provide a seamless interface between the CNAs and the virtual machines running on host system 110. BIOS 116 operates to provide low level input and output functionality to host system 110, and to initialize and set up the host system at power on. BIOS 116 includes a dedicated storage area on host system 110, for storing configuration settings for host system 110, such as an NVRAM, a Flash memory, or another storage device. Management controller 118 operates to provide status information for host system 110 to management system 140, and to provide set up and configuration settings for the host system from the management system. An example of a management controller includes a baseboard management controller (BMC), an integrated Dell remote access controller (iDRAC), another management controller, or a combination thereof.

CNA 120 includes a capability pointer 122 and a vendor provided data (VPD) 124, and CNA 130 includes a capability pointer 132 and a VPD 134. Capability pointers 122 and 132 represent entries in a configuration space of respective CNAs 120 and 130 that are read when the CNAs are initialized, and that include configuration information for the CNAs. VPD 124 and 134 represent memory storage space within respective CNAs 120 and 130 that are read by CNA driver 114 to provide vendor proprietary information including configuration information for the CNAs.

Management system 140 includes a hardware provisioning utility 142. Hardware provisioning utility 142 operates to implement a deployment template that identifies virtual network interface cards (vNICs) that are needed by VMM 112 for network routing, and that partitions CNAs 120 and 130 into the identified vNICs. An example of hardware provisioning utility 142 includes a Dell Active System Manager suite. The deployment template includes information needed to set up the partitions on CNAs 120 and 130, such as whether or not the partitions are intended to be redundantly established on more than one CNA, a minimum data bandwidth for each vNIC, a maximum data bandwidth for each vNIC, a maximum transfer unit (MTU) size for data packets handled by each vNIC, a priority level for each vNIC, or other information to partition the CNAs, as needed or desired. Management system 140 implements the deployment template on host system 110 in out-of-band (OOB) transactions with management controller 118, such that CNAs 120 and 130 are preconfigured to implement the specified vNICs prior to the launch of VMM 112 on the host system.

Figure 2:
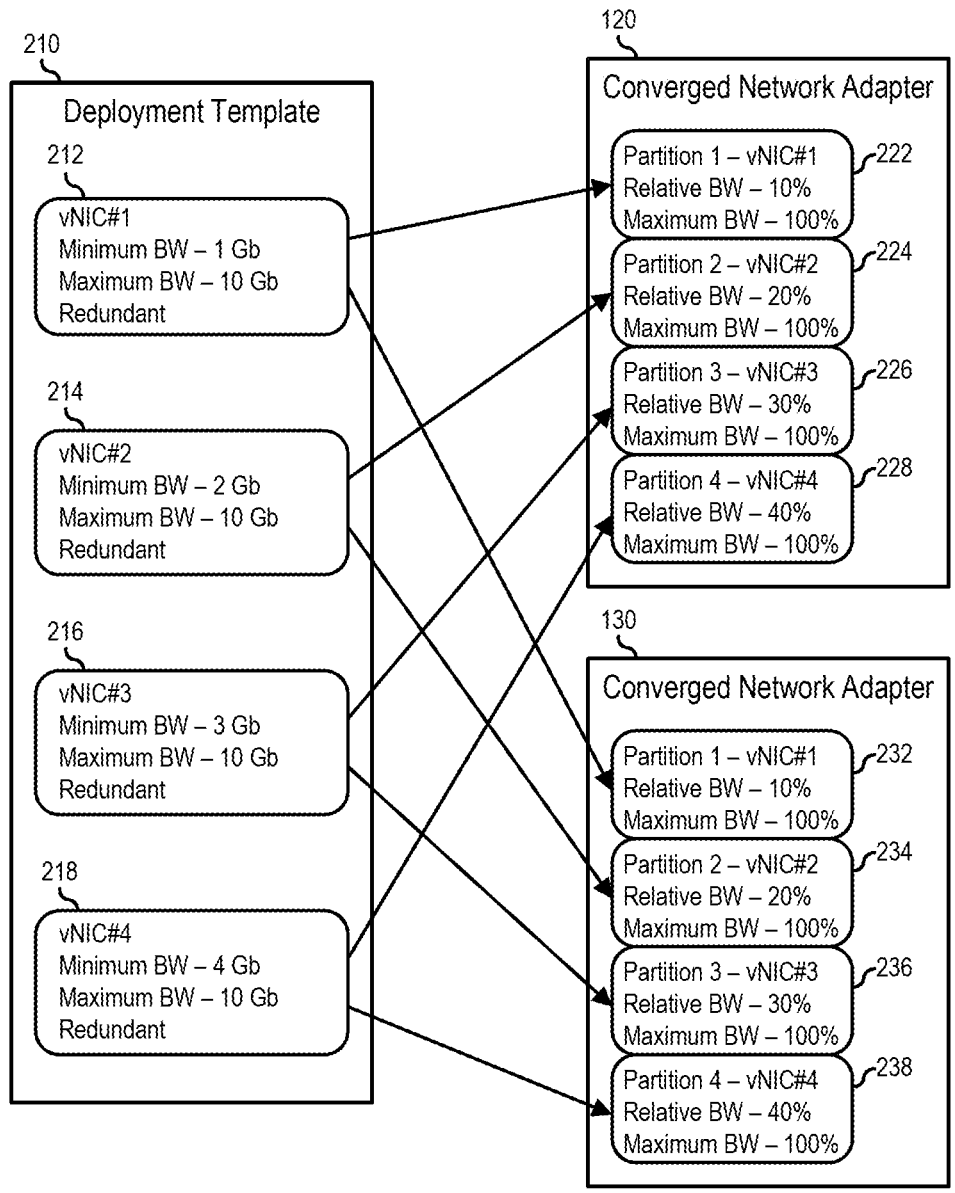
FIG. 2 is a block diagram illustrating an implementation of a deployment template in the virtualized system of FIG. 1.

FIG. 2 shows an implementation of deployment template 210 onto CNAs 120 and 130. Here, deployment template 210 includes vNIC definitions 212, 214, 216, and 218. Each of vNIC definitions 212, 214, 216, and 218 include a vNIC identifier, a minimum partition bandwidth, a maximum partition bandwidth, and a redundancy indicator. The skilled artisan will understand that deployment template 210 can include other information as needed or desired, that can be used to partition CNAs 120 and 130. In response to implementing deployment template 210, CNA 120 instantiates a first partition 222 that is associated with vNIC definition 212, a second partition 224 that is associated with vNIC definition 214, a third partition 226 that is associated with vNIC definition 216, and a fourth partition 228 that is associated with vNIC definition 218. Similarly, since vNIC definitions 212, 214, 216, and 218 all specify that the definitions should be redundant, CNA 130 instantiates similar partitions 232, 234, 236, and 238.

Returning to FIG. 1, in addition to configuring CNAs 120 and 130 with the vNIC parameters, hardware provisioning utility 142 operates to provide attribute data for each vNIC that permits a virtual switching layer of VMM 112 to map to the appropriate vNIC partitions on the CNAs. An example of the attribute data includes an intended usage of each vNIC, a reference as to whether or not each vNIC is associated with a redundant vNIC on a different CNA, network information such as virtual local-area-network (VLAN) associations, connection types, or other information used by VMM 112 to set up the virtual switching layer, as needed or desired. In a particular embodiment, the intended usage of each vNIC includes a pre-defined set of enumerations, such as for management traffic, virtual machine migration (vMotion) traffic, virtual machine LAN traffic, storage traffic, or other traffic enumerations, as needed or desired.

Hardware provisioning utility 142 provides the attribute data to management controller 118 for propagation to CNAs 120 and 130. In a particular embodiment, the attribute data is provided in the form of a capability pointer information, and management controller 118 performs an OOB operation on host system 110 to write the capability pointer information to CAN 120 and CAN 122, so that, when the host system is powered on, the capability pointer information will be obtained from capability pointers 122 and 132 as a product of initializing the CNA. In another embodiment, the attribute data is provided in the form of proprietary information, the form of which is determined by the manufacturer of CNAs 120 and 130. Here, management controller 118 performs an OOB operation on host system 110 to write the information to the NVRAM of BIOS 116, and then, when the host system is powered on, the BIOS writes the information to VPDs 124 and 134. Then, when needed by VMM 112, CNA driver 114 will read VPDs 124 and 134 and provide the attribute data to the VMM. In yet another embodiment, and management controller 118 performs an OOB operation on host system 110 to perform a combination of writing capability pointer information to capability pointers 122 and 132, and writing information to the NVRAM of BIOS 116.

Figure 3:
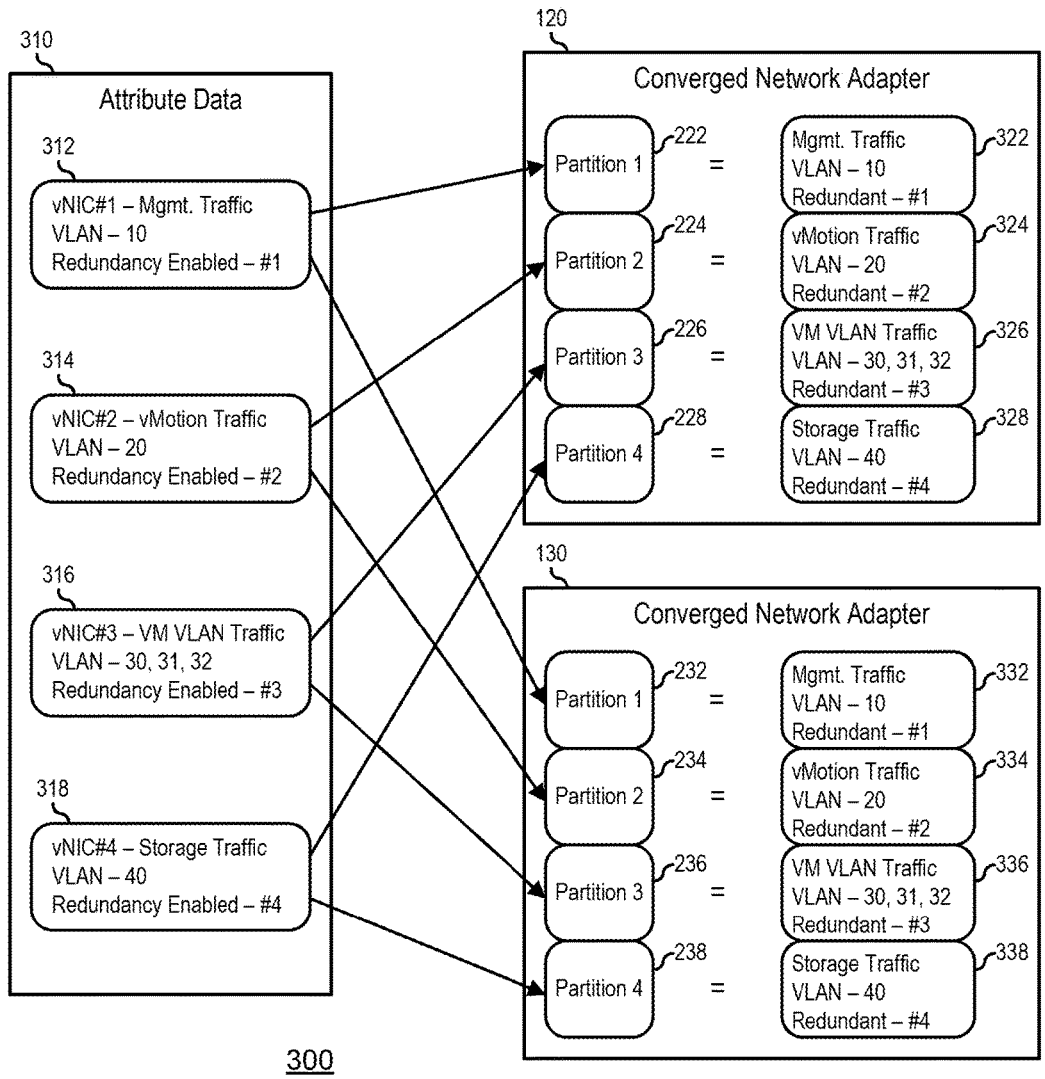
FIG. 3 is a block diagram illustrating an implementation of attribute data in the virtualized system of FIG. 1.

FIG. 3 shows an implementation of attribute data 310 onto CNAs 120 and 130. Here, attribute data 310 includes vNIC attribute definitions 312, 314, 316, and 318. Each of vNIC attribute definitions 312, 314, 316, and 318 include a traffic type associated with one of the vNIC identifiers, one or more VLANs associated with the vNIC, and a redundancy indicator. The skilled artisan will understand that attribute data 310 can include other information as needed or desired, that can be used to identify partitions 222, 224, 226, 228, 232, 234, 236, and 238 to VMM 112. In response to implementing attribute data 310, CNA 120 associates partition 222 with attribute data 322 as being for management traffic on VLAN 10, partition 224 with attribute data 324 as being for vMotion traffic on VLAN 20, partition 226 with attribute data 326 as being for VM LAN traffic on VLANs 30, 31, and 32, and partition 228 with attribute data 328 as being for storage traffic on VLAN 40. Similarly, since vNIC attribute definitions 312, 314, 316, and 318 all specify that the definitions should include redundant vNICs, CNA 130 instantiates similar attribute associations between attribute data 332, 334, 336, and 338, and partitions 232, 234, 236, and 238.

Figure 4:
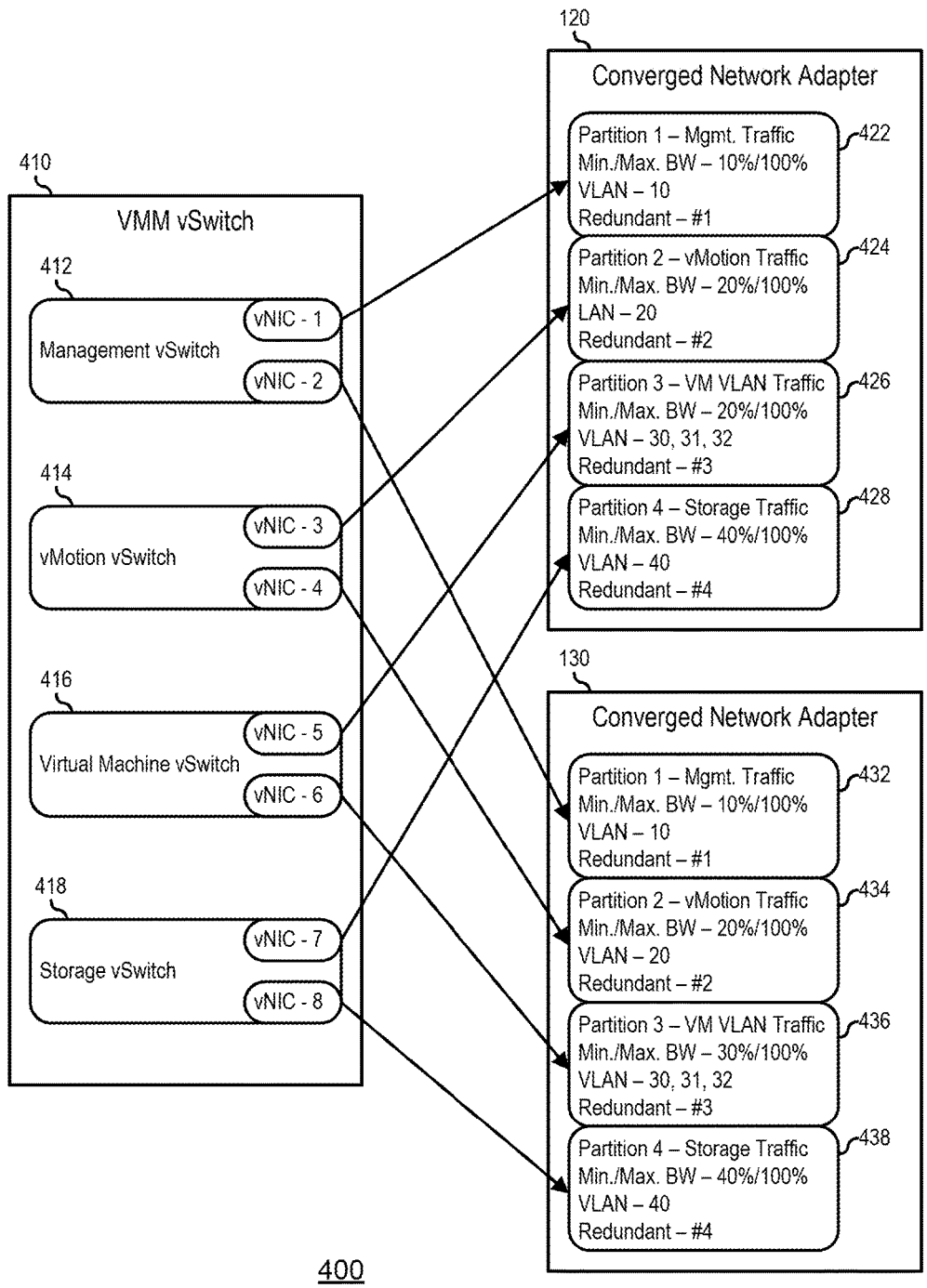
FIG. 4 is a block diagram illustrating an implementation of mapping virtual NICs in the virtualized system of FIG. 1.

FIG. 4 shows the mapping of vNICs in a VMM vSwitch 410 to the attributed partitions 422, 424, 426, and 428 in CNA 120, and to the attributed partitions 432, 434, 436, and 438 in CNA 130. Here, VMM vSwitch 410 includes a channel 412 for management traffic that includes a pair of vNICs that are connected to attributed partition 422 and 432, includes a channel 414 for vMotion traffic that includes a pair of vNICs that are connected to attributed partition 424 and 434, includes a channel 416 for VM VLAN traffic that includes a pair of vNICs that are connected to attributed partition 426 and 436, and includes a channel 418 for storage traffic that includes a pair of vNICs that are connected to attributed partition 428 and 438. Here, for example, VMM 112 can receive the information related to attributed partitions 422, 424, 426, 428, 432, 434, 436, and 438 by configuring CNAs 120 and 130 and reading the capabilities pointers 122 and 132, by reading VPD 124 and 134, or by a combination thereof. In a particular embodiment, when VMM 112 is launched, the VMM queries one or more of CNAs 120 and 130 to determine if they include attribute data, and, if so, directs CNA driver 114 to read all of the attribute data from the CNAs in order to configure VMM vSwitch 410. In another embodiment, when VMM 112 is launched, the VMM queries each of CNAs 120 and 130 for attribute data associated with a particular type of traffic, and if it is available on the CNA, the VMM receives the attribute data to set up VMM vSwitch for that type of traffic, and then repeats the process for each other type of traffic, as needed or desired.

Figure 5:
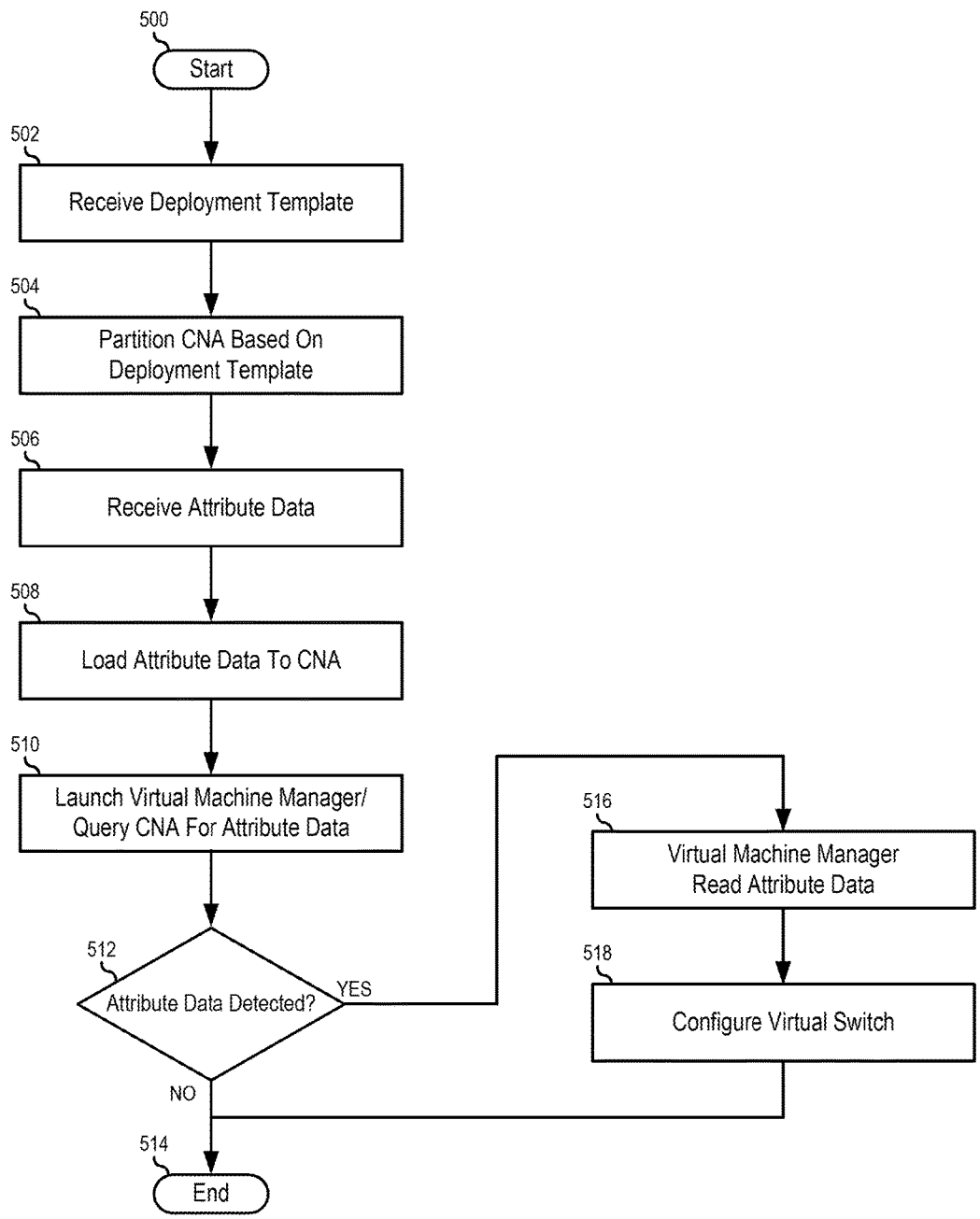
FIG. 5 is a flow chart illustrating a method for automating virtual network provisioning according to an embodiment of the present disclosure.

FIG. 5 shows a method of automating virtual network provisioning starting at block 500. A deployment template is received by a host system in block 502. For example, deployment template 210 can be provided by hardware provisioning utility 142 to host system 110. One or more CNAs are partitioned based upon the deployment template in block 504. Here, CNAs 120 and 130 can be partitioned into partitions 222, 224, 226, 228, 232, 234, 236, and 238. Attribute data for the partitions is received by the host system in block 506. Here, attribute data 310 can be provided by hardware provisioning utility 142 to host system 110. The attribute data is loaded to the one or more CNAs in block 508. In a particular embodiment, the attribute data is written to a capability pointer, such as one or more of capability pointers 122 and 132. In another embodiment, the attribute data is written to a storage space associated with a BIOS of the host system, such as BIOS 116, and the BIOS writes the attribute data to a VPD area of the one or more CNAs, such as to VPDs 124 and 134.

A VMM, such as VMM 112, is launched on the host system in block 510, and the one or more CNAs are queried by the VMM to determine if any attribute data is stored therein. For example, CNA driver 114 can query CNAs 120 and 130 to detect the presence of the attribute data in capability pointers 122 and 132, and in VPDs 124 and 134. A decision is made as to whether or not attribute data is detected in the one or more CNA in decision block 512. If not, the "NO" branch of decision block 512 is taken and the method ends in block 514. If attribute data is detected in the one or more CNA, the "YES" branch of decision block 512 is taken, the VMM reads the attribute data in block 516, and the VMM configures a virtual switch of the VMM based on the attribute data in block 518, and the method ends in block 514.

Figure 6:
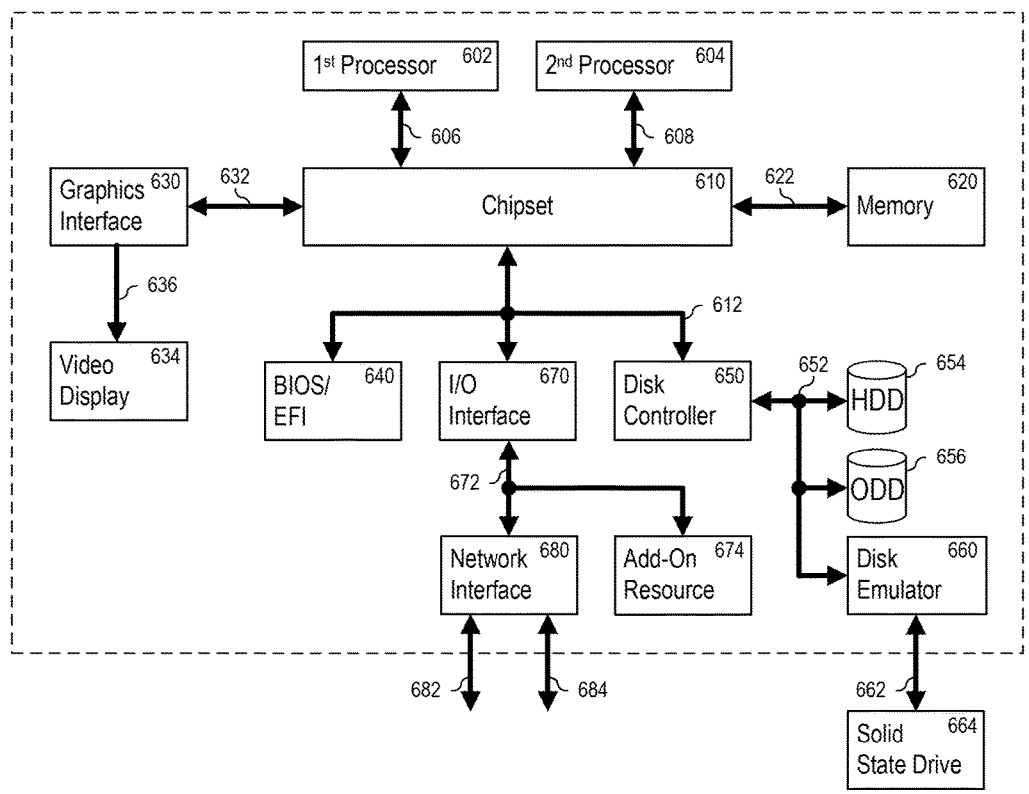
FIG. 6 is a block diagram illustrating a generalized information handling system according to an embodiment of the present disclosure.

FIG. 6 illustrates a generalized embodiment of information handling system 600. Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be coupled to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674 and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a management controller of a host system, a deployment template from a management system coupled to the management controller, wherein the deployment template is received out of band from a processing device of the host system, and wherein the deployment template includes a first virtual network interface card definition for a first virtual network interface card for use by a first virtual machine instantiated on the host system;
   partitioning, by the host system, a first networking device of the host system with a first virtual network partition based upon the deployment template prior to launching a virtual machine manager on the host system, wherein the first virtual network partition is associated with the first virtual network interface card definition;
   receiving, at the management controller, attribute data, wherein the attribute data includes a first virtual local area network (VLAN) associated with the first virtual network interface card;
   loading, by the management controller, the first networking device with the attribute data prior to launching the virtual machine manager, wherein the attribute data preconfigures the first networking device to implement the first VLAN on the first virtual network partition;
   launching, by the first processing device, the virtual machine manager on the host system;
   querying, by the virtual machine manager, the first network device to determine if the first network device includes the attribute data;
   reading, by the virtual machine manager, the attribute data from the first networking device;
   assigning, by the host system, the first VLAN to the first virtual network partition; and
   configuring a virtual switch associated with the virtual machine manager to associate the first virtual machine with the first virtual network interface card.

2. The method of claim 1, wherein:
   the attribute data includes an indication that the first VLAN is associated with a network traffic type; and
   assigning the first virtual network interface card to the first VLAN is in further response to determining that the first virtual network interface card is associated with the network traffic type.

3. The method of claim 1, wherein the deployment template includes a second virtual network interface card definition for a second virtual network interface card for use by a second virtual machine instantiated on the host system, the method further comprising:
   partitioning the first networking device of the host system with a second VLAN based upon the deployment template, wherein the second VLAN is associated with the second virtual network interface card definition, and wherein the attribute data includes an attribute associated with the second virtual network interface device;
   querying, by the virtual machine manager, the first network device to determine if the first network device includes the attribute;
   reading, by the virtual machine manager, the attribute from the first networking device; and
   assigning the second virtual network interface card to the second VLAN.

4. The method of claim 3, further comprising:
   configuring the virtual switch to associate a second virtual machine with the second virtual network interface card.

5. The method of claim 1, further comprising:
   partitioning a second networking device of the host system with a second VLAN based upon the deployment template, wherein in the second VLAN is associated with the first virtual network interface card definition, and wherein the attribute data is also associated with the second virtual network interface device;
   assigning the first virtual network interface card to the second VLAN; and
   configuring the virtual switch to associate the first virtual machine with the second virtual network interface card.

6. The method of claim 5, wherein:
   the attribute includes an indication that the first VLAN and the second VLAN are redundant network partitions.

7. The method of claim 1, wherein in loading the first network device with the attribute data, the method further comprises:
   loading the attribute data to a capability pointer of the first network device.

8. The method of claim 1, wherein in loading the first network device with the attribute data, the method further comprises:
   loading the attribute data to a memory associated with a basic input/output system of the host system; and
   loading the attribute data from the memory to a vendor provided data storage of the first network device.

9. A host system comprising:
   a processor;
   a first networking device; and
   a management controller to:

receive a deployment template out of band from the processing device, wherein the deployment template includes a first virtual network interface card definition for a first virtual network interface card for use by a first virtual machine instantiated on the host system;

partition the first networking device with a first virtual network partition based upon the deployment template prior to launching a virtual machine manager on the host system, wherein the first virtual network partition is associated with the first virtual network interface card definition;

receive attribute data, wherein the attribute data includes a first virtual local area network (VLAN) associated with the first virtual network interface card; and load the first networking device with the attribute data prior to launching the virtual machine manager, wherein the attribute preconfigures the first networking device to implement the first VLAN on the first virtual network partition;

wherein the processor is operable to launch the virtual machine manager to:
query the first network device to determine if the first network device includes the attribute data;
read the attribute data from the first networking device;
assign the first virtual network interface card to the first virtual network partition; and
configure a virtual switch associated with the virtual machine manager to associate the first virtual machine with the first virtual network interface card.

10. The host system of claim 9, wherein:
the attribute data includes an indication that the first virtual network partition is associated with a network traffic type; and
assigning the first virtual network interface card to the first virtual network partition is in further response to determining that the first virtual network interface card is associated with the network traffic type.

11. The host system of claim 9, wherein:
the deployment template includes a second virtual network interface card definition for a second virtual network interface card for use by a second virtual machine instantiated on the host system;
the management controller is further to partition the first networking device with a second virtual network partition based upon the deployment template, wherein the second virtual network partition is associated with the second virtual network interface card definition, and wherein the attribute data includes an attribute associated with the second virtual network partition; and
the virtual machine manager is further operable to:
query the first network device to determine if the first network device includes the attribute:
read the attribute data from the first networking device;
assign the second virtual network interface card to the second virtual network partition; and
configure the virtual switch to associate a second virtual machine with the second virtual network interface card.

12. The host system of claim 9, further comprising:
a second networking device;
wherein:
the management controller is further to partition the second networking device with a second virtual network partition based upon the deployment template, wherein in the second virtual network partition is associated with the first virtual network interface card definition, and wherein the attribute data is also associated with the second virtual network partition; and
the virtual machine manager is further to assign the first virtual network interface card to the second virtual network partition, and to configure the virtual switch to associate the first virtual machine with the second virtual network interface card.

13. The host system of claim 12, wherein:
the attribute includes an indication that the first virtual network partition and the second virtual network partition are redundant network partitions.

14. The host system of claim 9, wherein in loading the first network device with the attribute data, the management controller is further to:
load the attribute data to a capability pointer of the first network device.

15. The host system of claim 9, wherein in loading the first network device with the attribute data:
the management controller is further to load the attribute data to a memory associated with a basic input/output system of the host system; and
the processor is further to load the attribute data from the memory to a vendor provided data storage of the first network device.

16. A non-transitory computer-readable medium including code for performing a method, the method comprising:
receiving, at a management controller of a host system, a deployment template from a management system coupled to the management controller, wherein the deployment template is received out of band from a processing device of the host system, and wherein the deployment template includes a first virtual network interface card definition for a first virtual network interface card for use by a first virtual machine instantiated on the host system;
partitioning, by the host system, a first networking device of the host system with a first virtual network partition based upon the deployment template prior to launching a virtual machine manager on the host system, wherein the first virtual network partition is associated with the first virtual network interface card definition;
receiving, at the management controller, attribute data, wherein the attribute data includes a first virtual local area network (VLAN) associated with the first virtual network interface card;
loading, by the management controller, the first networking device with the attribute data prior to launching the virtual machine manager, wherein the attribute data preconfigures the first networking device to implement the first VLAN on the first virtual network partition;
launching, by the first processing device, the virtual machine manager on the host system;
querying, by the virtual machine manager, the first network device to determine if the first network device includes the attribute data;
reading the attribute data from the first networking device;
assigning, by the host system, the first VLAN to the first virtual network partition; and
configuring a virtual switch associated with the virtual machine manager to associate the first virtual machine with the first virtual network interface card.

17. The computer-readable medium of claim 16, wherein:
the attribute data includes an indication that the first virtual network partition is associated with a network traffic type; and assigning the first virtual network interface card to the first virtual network partition is in further response to determining that the first virtual network interface card is associated with the network traffic type.

* * * * *